United States Patent [19]

Anderson et al.

[11] Patent Number: 4,911,609
[45] Date of Patent: Mar. 27, 1990

[54] FLUID PUMP

[75] Inventors: George F. Anderson; Glenn E. Anderson, both of Mountaintop, Pa.

[73] Assignee: Muskin, Inc., Incline Village, Nebr.

[21] Appl. No.: 266,210

[22] Filed: Oct. 27, 1988

Related U.S. Application Data

[63] Continuation of Ser. No. 912,714, Sep. 29, 1986, abandoned.

[51] Int. Cl.$^4$ .............................................. F04D 29/08
[52] U.S. Cl. .............................. 415/174.2; 415/213.1; 277/96.2; 248/674
[58] Field of Search ................. 277/96, 96.2, 88, 89, 277/90; 248/674; 415/170.1, 174.2, 174.3, 172.1, 213.1

[56] References Cited

U.S. PATENT DOCUMENTS

| | | | |
|---|---|---|---|
| 1,822,009 | 9/1931 | Carr | 415/219 R |
| 2,674,473 | 4/1954 | Berger | 277/96.2 |
| 2,769,390 | 11/1956 | Heimbuch | 415/111 |
| 2,983,125 | 5/1961 | Peickll et al. | 277/90 |
| 3,001,807 | 9/1961 | Amirault | 277/89 |
| 3,391,941 | 7/1968 | Donley | 277/89 |
| 3,391,942 | 7/1968 | Wilson | 277/96.2 |
| 3,491,696 | 1/1970 | Howard | 415/201 |
| 3,658,349 | 4/1972 | Stevens | 277/89 |
| 3,874,680 | 4/1975 | Mustoe et al. | 277/96 R |
| 4,386,969 | 6/1983 | Kilbert | 277/96.2 |
| 4,509,773 | 4/1985 | Wentworth | 415/170 A |
| 4,575,306 | 3/1986 | Monnot | 415/170 A |
| 4,601,378 | 7/1986 | Pierce et al. | 248/674 |
| 4,645,172 | 2/1987 | Wilson | 248/674 |
| 4,703,939 | 11/1987 | Wentworth | 277/96.2 |

FOREIGN PATENT DOCUMENTS

| | | | |
|---|---|---|---|
| 1528848 | 9/1970 | Fed. Rep. of Germany | 415/173 A |
| 420324 | 4/1947 | Italy | 415/113 |
| 923098 | 4/1963 | United Kingdom | 415/113 |

Primary Examiner—Robert E. Garrett
Assistant Examiner—John T. Kwon
Attorney, Agent, or Firm—Townsend and Townsend

[57] ABSTRACT

A fluid pump having a pump housing, and an impeller in the housing and coupled to the drive shaft of a drive motor. An improved main seal is provided in the housing to seal the hole through which the drive shaft extends. The seal includes a carbon seal member having a flat end face in sliding relationship to the flat end face of a ceramic seal rotatable with the drive shaft and the impeller. The seal further includes a pre-loaded element which forces the two seal faces together. An improved mounting bracket is provided to mount the drive motor and the pump housing on a fixed support. The mounting bracket includes a central mounting plate and a pair of inclined, side wings which extend from the pump housing toward the drive motor so as to eliminate the need for a second bracket on the opposite side of the motor.

9 Claims, 3 Drawing Sheets

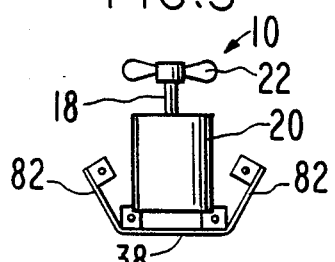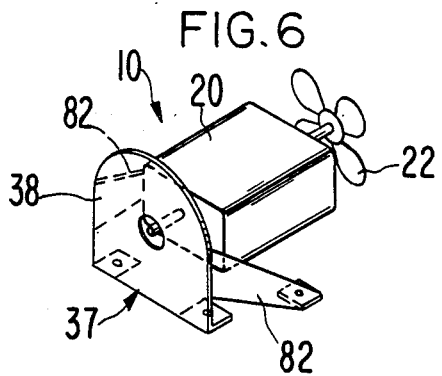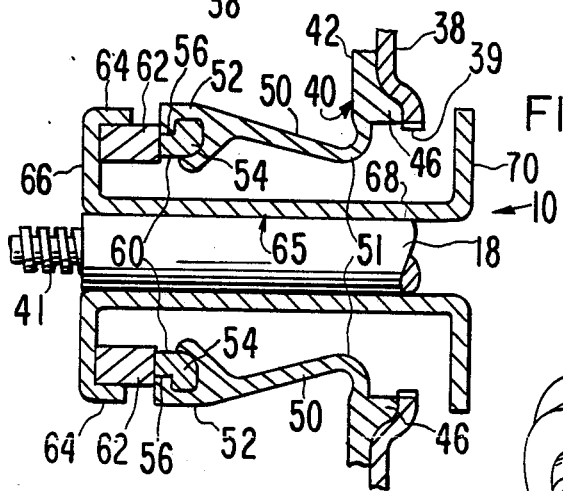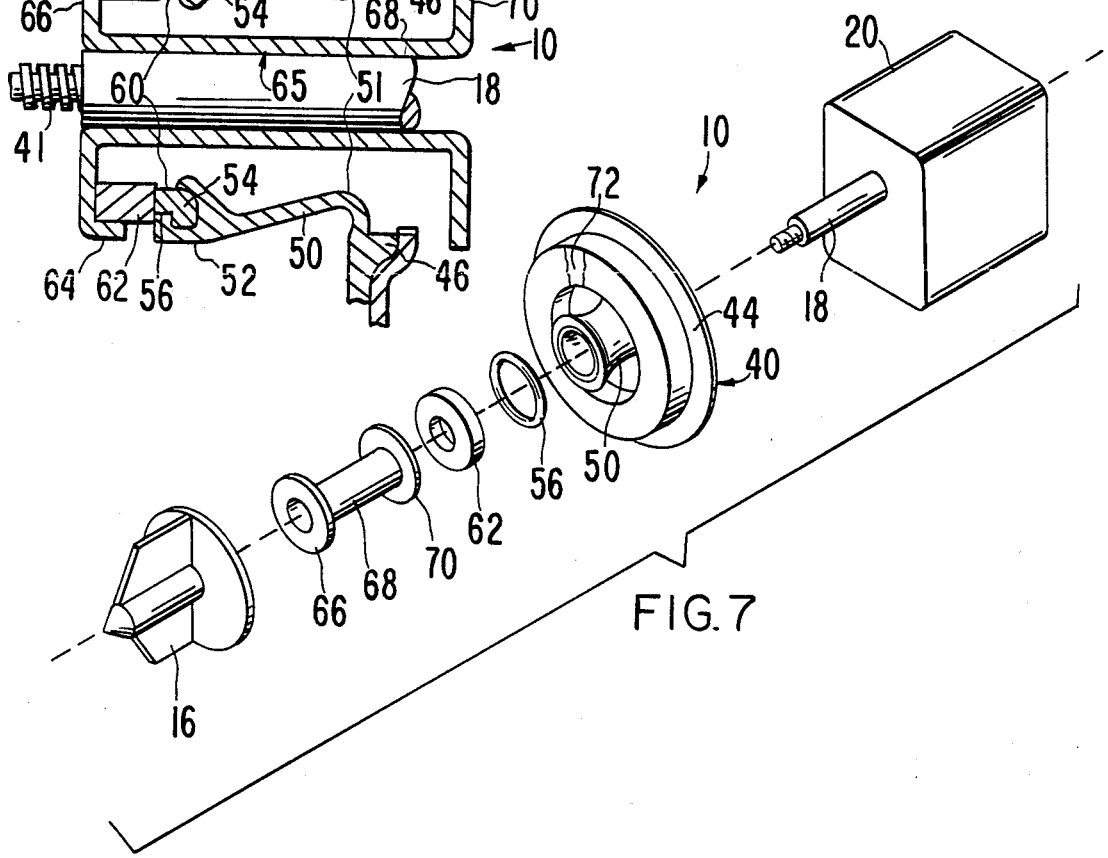

FLUID PUMP

This is a Continuation Division of application Ser. No. 06/912,714, filed Sept. 29, 1986, now abandoned.

This invention relates to improvements in the construction of water pumps typically of the type used for a swimming pool and, more particularly, to a fluid pump having an improved seal and mounting bracket.

BACKGROUND OF THE INVENTION

Fluid pumps of conventional design typically have seal and mounting problems associated with them so that improvements are always being sought to minimize such problems, if possible. For instance, one type of fluid pump made by Coleco Corporation has a seal which requires a supplementary lubricant to insure seal life. Moreover, to meet requirements of Underwriters Laboratories requiring double insulation, the motor shaft has to be separated with an air gap of approximately ⅛ of an inch. This is accomplished by separating the shafts by interconnecting two spaced shaft segments with a water slinger. The problem with this design is as follows:

1. There is excessive run-out of the two motor shaft segments and the water slinger interconnecting the shaft segments. This condition causes the shaft coupled to the impeller to run in an orbital path, causing seal problems to be created due to seal oscillation, premature work hardening of seal material and seal lip skipping.
2. The water slinger is costly to manufacture due to Underwriter Laboratory requirements and close tolerances on dimensions.
3. The seal requires a special lubricant to allow for durability without burnout.
4. The shaft segment coupled to the impeller requires high quality surface finish and surface preparation to allow the seal to function properly.
5. In addition to the foregoing, the cost of the components is relatively high.

In another prior art fluid pump, such as one of the type made by Doughboy Corporation, the motor drive shaft coupled to the impeller is of a one-piece construction and the base seal requires an outer metallic can for housing a rubber seal and forming a stop for a pressure spring. A carbon ring mates to a ceramic seal ring to seal the pump cavity.

The problems associated with this last-mentioned prior art fluid pump are that the metallic seal can is in direct contact with the pool water so that the rear motor pump mounting bracket has to be of an insulating material, such as plastic, to meet Underwriter Laboratory requirements. Moreover, the seal pressure spring is sensitive to spring rate (pressure) because of low motor starting torques. This condition requires very close assembly tolerances which are costly. Other problems include the high cost of seal assembly and the fact that the motor pump mounting base requires low tolerance manufacturing techniques.

Because of the foregoing drawbacks in prior art fluid pumps, a need exists for improvements in a fluid pump in which a motor drive shaft is coupled to an impeller through a seal for isolating a pump cavity containing the impeller. The present invention satisfies this need.

SUMMARY OF THE INVENTION

The present invention is directed to an improved fluid pump with a seal defined by a seal body secured in a position across the shaft receiving opening of a cavity. A ceramic seal rotatable with the impeller rotates along the end face of a stationary carbon seal carried by an annular seat on a conical extension of the main seal with the conical extension being pre-loaded and under compression so as to urge the mating faces of the carbon seal and the ceramic seal together at all times, whereby the ceramic seal can rotate relative to the carbon seal while maintaining a sealed junction therebetween.

The ceramic seal is surrounded partially by a shell forming one end part of a resilient boot whose opposite end part provides a water slinger which surrounds the drive shaft of the motor. Thus, the ceramic seal is positively coupled to the impeller for rotation therewith.

The outer periphery of the seal body is clamped between the outer peripheral flange of a pump housing and an end plate forming a part of the mounting bracket of the present invention. The mounting bracket includes an end flange on the end margin of the mounting plate. A pair of flared side support wings are angled away from the motor center line and extend rearwardly towards the rear of the motor. The outer ends of the mounting plate and the wings are coupled by fasteners to the mounting support fixed relative to the motor. In this way, the bracket of the present invention eliminates one of the two brackets of the prior art and provides mounting supports for the rear of the assembly of the fluid pump while improving fan and electrical clearance, eliminating the need to assemble rear bracket mounting screws between fan blades, providing a mounting configuration that allows old design interchangeability, allowing for shorter pump/motor assembly lengths, and eliminating magnetic field shrouding.

The primary object of the present invention is to provide an improved fluid pump which eliminates certain problems associated with the seals and brackets of conventional fluid pumps and provides an efficient main seal as well as simplifying the mounting requirements for the pump.

Other objects of this invention will become apparent as the following specification progresses, reference being had to the accompanying drawings for an illustration of the invention. IN THE DRAWINGS:

FIG. 3a is an enlarged, schematic view of a part of the seal of the present invention;

FIG. 5 is a top plan view of the mounting structure of the fluid pump of the present invention;

FIG. 6 is a perspective view of the mounting structure of FIG. 5; and

Figure 1:
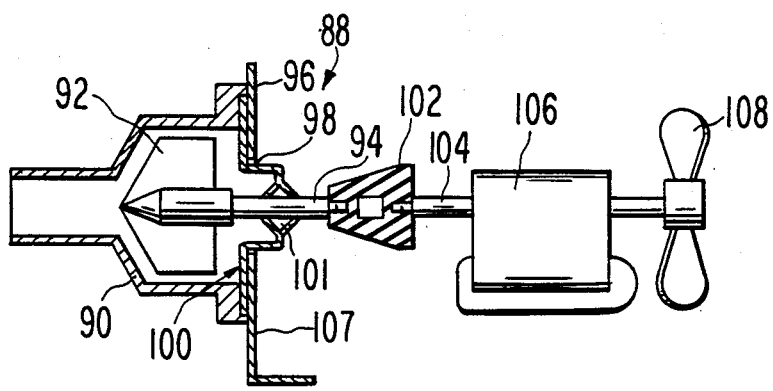
FIG. 1 is a schematic, cross-sectional view of a first prior art fluid pump, showing current main seal means and mounting bracket structure.
Figure 1A:
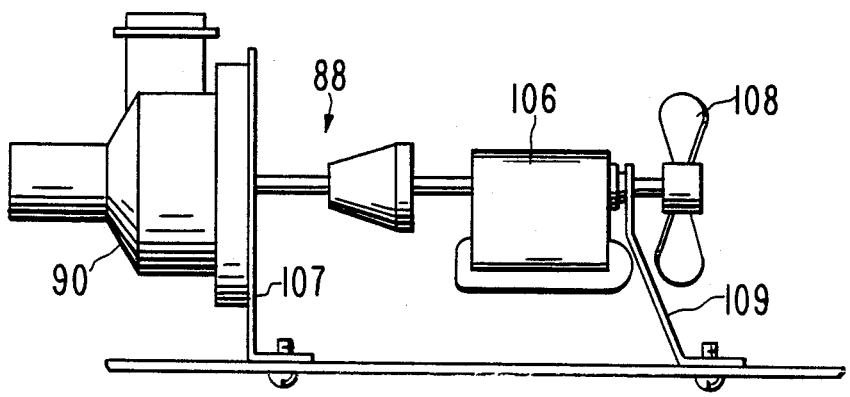
FIG. 1a is a side elevational view of the fluid pump of FIG. 1.
Figure 1C:
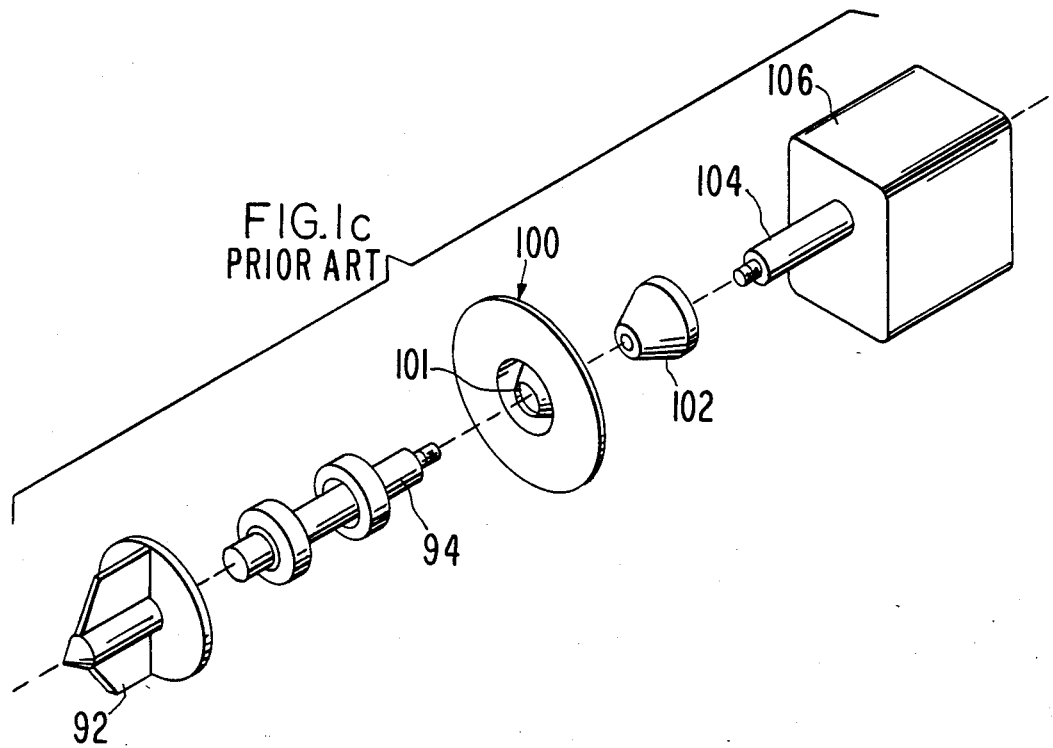
FIG. 1c is a perspective, exploded view of the fluid pump of FIG. 1 showing the various components thereof.

FIG. 7 is a view similar to FIG. 1c but showing the fluid pump of the present invention in an exploded view. The fluid pump which is the subject of the present invention is broadly denoted by the numeral 10 and includes a pump housing 12 provided with an interior space 14 for rotatably receiving a rotary impeller 16 mounted on a shaft 18 of a drive motor 20. Shaft 18 extends through the motor and has a fan blade 22 thereon for cooling the motor during use.

Pump housing 12 has a tubular extension 24 defining a fluid inlet 26 for water, for instance, if the pump 10 is used with a swimming pool or the like. A second extension 28 on the cylindrical main portion 30 of pump housing 12 defines a fluid outlet 32 which is substantially tangential to the rotary path of travel of impeller 16.

Pump housing 10 has an annular flange 34 surrounding one end thereof. Screws 36 passing through flange 34 are threaded into end plate 38 of a mounting bracket 37 so that the end plate 38 closes the opening at the one end of the pump housing except for a central hole 39 in end plate 38 to allow shaft 18 to extend into the space 14. The inner end of shaft 18 is threadably or otherwise rigidly secured to impeller 16 so that the impeller will rotate with the shaft when motor 20 is energized.

Figure 3:
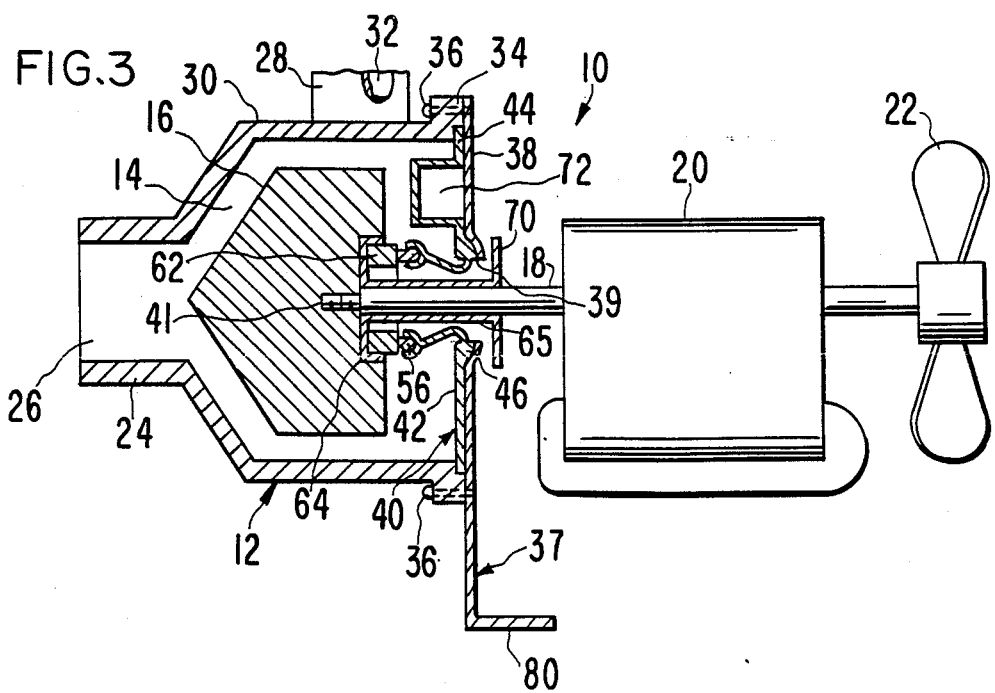
FIG. 3 is a view similar to FIGS. 1 and 2 but showing a fluid pump having the improvements of the present invention.

A seal 40 is provided within space 14 adjacent to end plate 38 for sealing the central hole 39 in the end plate. To this end, the seal includes a disk-like body 42 which is contiguous with the inner surface of end plate 38 and held and has an outer peripheral margin 44 which is clamped between flange 34 and plate 38 by screws 36 as shown in FIG. 3. Seal body 42 has an annular enlargement 46 on an annular end segment 51 extending laterally from one end of a tubular element or part 50 as shown in FIG. 3a. Enlargement 46 is complementally received within an annular recess formed by an annular, outwardly bowed portion 48 of end plate 38 as shown in FIG. 3a. End segment 51 is integral with part 50 as shown in FIG. 3a.

Seal body 42 further includes tubular, cone-shaped central element or part 50 (FIG. 3a) having and annular, transversely U-shaped end element or seat 52 at the opposite end of part 50 for receiving an annular rib 54 of a carbon ring seal 56 having an end face 58 in sliding engagement with the end face 60 of a ceramic ring seal 62 which is captured by an annular shell 64 forming a part of a tubular boot 65 which is fitted over and rotates with shaft 18. A disk-like end member 70 is integral with boot 65 on the opposite end thereof and serves as a water slinger. Shell 64 is in frictional engagement with the inner end face of impeller 16 so that shell 64 and ceramic seal 62 rotate with the shaft 18 relative to carbon seal 56.

The conical shape of part 50 is selected so that the seal can be and is pre-loaded by tension at the junction of the side wall of part 50 and the end segment 51. When pre-loaded the part 50 is under compression and the junction between the side wall of part 50 and end segment 51 is under tension so that the side wall of part 50 is biased to the left when viewing FIG. 3a, to thereby bias end face 58 into engagement with face 60 so that the mating faces will remain in contact with each other as face 60 rotates relative to face 58 under the influence of shaft 18.

Seal body 42 can be optionally provided with means defining a curved or annular space or cavity 72 (FIG. 3). The purpose of cavity 72 is to reduce the volume of space 14. FIG. 7 shows that, if used, the cavity can be annular.

Seal 40 is, therefore a combination of the face seal caused by surfaces 58 and 60 being in contact with each other (FIG. 3a) and the outer peripheral seal provided at the outer peripheral portion 44 (FIG. 3) of the seal body 42. The seal of the present invention is unique because it does not require a seal can, spring, separate rubber boot or seal retainer as in certain prior art devices, on of which will be disclosed hereinafter. Seal 40 is of a one-piece construction and of molded rubber or other flexible material with a carbon face seal ring 56 nested in molded seat 52 which positions and seals the carbon ring 56.

The water seal between carbon and ceramic seals 56 and 62 is maintained by elastic energy that is created when the main seal 40 is pre-loaded during the ceramic seal assembly. FIG. 3a shows the position of conical part 50 before and after pre-loading the seal body. Pre-loading the seal eliminates the necessity to use wire springs, seal retainers and seal cans. The seal pre-load force can be varied by increasing or decreasing the material durometer or by changing the preset dimensions of component parts.

The seal 40 has at least five functions and advantages, namely it seals the outer housing cavity 14, it provides a means to retain the carbon seal 56 concentric with ceramic seal 62, it provides the means to keep carbon seal 56 from rotating as shaft 18 is rotating, it can for a pump cavity displacement reducing volume 72 which reduces water circulation in the pump, and provides an insulation barrier between pump water and electrical components such as metallic mounting brackets and the metallic drive shaft 18 of the motor. The ceramic seal 62 is sealed by boot 65 and the boot further provides an electrical insulator to encapsulate motor shaft 18 and provide water slinger 70, all as a one-piece component.

Figure 4:
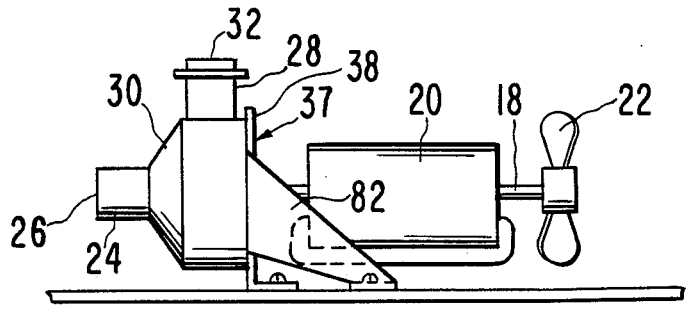
FIG. 4 is a view similar to FIGS. 1a but showing a part of the fluid pump of the present invention.

Bracket 37 is typically of a plastic material and is of one-piece construction. It includes a first end flange 80 on plate 38 and a pair of inclined side wings 82 integral with plate 38 as shown in FIGS. 4-6. The bracket is therefore unitized and the two support wings 82 are angled away from the motor center line and back towards the rear of the motor. Bracket 37 provides motor mounting support in the rear; it eliminates the need for a second bracket; it improves fan and electrical isolation; it eliminates the need to assemble rear bracket mounting screws between fan blades; it provides a mounting configuration that allows old design interchangeability; it allows for shorter pump/motor assembly lengths; and it allows, by virtue of wings 82, to eliminate magnetic field shrouding.

Figure 2:
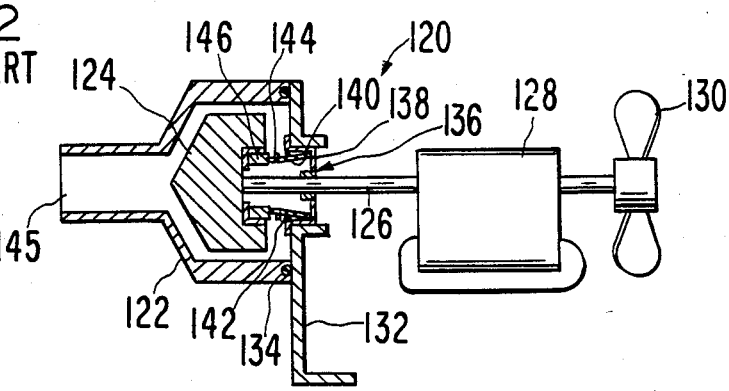
FIG. 2 is a view similar to FIG. 1 but showing another prior art fluid pump.

The present invention is to be contrasted with the pump structure of several prior art pumps shown in FIGS. 1 and 2. In the pump of FIG. 1, a pump housing 90 has an impeller 92 mounted on a shaft 94 extending through a mounting plate 96 having a central hole 98 which is covered by a seal 100. An insulator-slinger member 102 connects shaft 94 up with the drive shaft 104 of a drive motor 106 having a cooling fan 108 on the opposite end of shaft 104. To meet Underwriters Laboratories requirements of double insulation, the prior art motor 88 shown in FIG. 1 must have shaft 104 separated from shaft 94 with a 150-inch air gap provided by water slinger 102. The problems associated with this design are as follows:

1. There is excessive run-out of the motor drive shaft 104, slinger 8 and shaft 94. This condition causes shaft 94 to run in an orbital path which creates seal life problems due to seal oscillation, premature work hardening of seal material and seal lip skipping.
2. Water slinger 102 is costly and difficult to manufacture due to requirements of Underwriter Laboratories and close tolerances on dimensions.
3. Seal 100 requires a special lubricant in the central cavity 101 to allow endurance without burn-out.
4. Shaft 94 requires high quality surface finish and special microseal surface preparation to allow the seal to function on the shaft.
5. The cost of the components of the water pump 88 are excessive.

The prior art water pump 88 also requires a pair of spaced brackets 107 and 109 to support the weight of motor 106. The problems with concept include the following:
1. The cost of two brackets as distinguished from the cost of a single bracket.
2. The difficulty in the assembly of the bracket.
3. The problems of obtaining sufficient motor terminal and coil dielectric air clearance due to motor bracket location and requirements.
4. The cooling fan problem, the close fit requirements, the fan shrouding and the inefficiency due to space limitations. Another prior art water pump is broadly denoted by the numeral 120 and is of the type made by Doughboy Corporation. It has a pump housing 122, an impeller 124, a drive shaft 126, a drive motor 128 with a cooling fan blade 130. A mounting bracket 132 mounts pump housing 122 in a position so that the impeller 124 can be coupled to drive shaft 126. An O-ring 134 is provided at the end face of pump housing 122 for engagement with the adjacent face of bracket 122. Shaft 126 is a one-piece design which threads into impeller 124. The base seal 136 is of conventional design and requires a outer metal can 138, a conical rubber seal 140, a pressure spring 142 and a carbon face ring 144 which mates to a ceramic seal ring 146 to seal the pump cavity.

Because of the metal seal base 138, the metal seal is in direct contact with the pool water entering the pump through the inlet 145 thereof. Because of this, the rear motor/pump mounting bracket 132 must be of plastic material to meet Underwriter Laboratory requirements.

The seal pressure spring 142 is sensitive to spring rate (pressure) because of low motor starting torque. The requires very close assembly tolerances which are costly. Another problem is the high cost of the assembly of the seal of water pump 120. The motor pump mounting base requires low tolerance manufacturing techniques.

The present invention avoids the problems associated with the prior art devices shown in FIGS. 1 and 2. It provides a combination face and pump seal. It further provides a ceramic seal boot/slinger. Finally, it provides a unitized motor mounting bracket.

We claim:
1. In a fluid pump:
a pump housing having a rotary impeller therein;
a mounting plate having a central hole therethrough;
a rotatable drive shaft extending through the central hole of the mounting plate and coupled with the impeller for rotating the impeller in the pump housing; and
a main seal for sealing the hole in the mounting plate while allowing rotation of the shaft and impeller relative to the mounting plate, said main seal including a first part coupled with the impeller for rotation therewith, a second part fixed relative to the shaft, and an elongated, tubular, resilient element extending axially of and surrounding the shaft, said element having a sidewall and a pair of opposed ends, there being an annular end segment integral with the sidewall and extending laterally therefrom at one end thereof, the junction of said sidewall and said end segment being under tension for urging the first and second parts into surface engaging relationship with each other, and a third part for sealing the outer periphery of the pump housing to the mounting plate, said element, said end segment and said third part being of one-piece construction and said element extending away from the hole and toward the impeller, said element being free of structure immediately surrounding the same.

2. In a fluid pump as set forth in claim 1, wherein the element has an annular, hollow seat, said second part having a rib removably received within said seat.

3. In a fluid pump as set forth in claim 2, wherein the seat is transversely U-shaped.

4. In a fluid pump as set forth in claim 1, wherein the main seal comprises a body having a hole in the center thereof, said element having an annular enlargement at the outer end of said extension adjacent to the hole in the mounting plate, said plate having an annular recess surrounding said hole, the enlargement being removably received in said recess of the plate.

5. In a fluid pump as set forth in claim 4, wherein said disk shaped body member has an outer peripheral margin, said margin being clamped between the inner surface of the end plate and the outer face of the pump housing.

6. In a fluid pump as set forth in claim 4, wherein the disk shaped body means defining a circumferentially extending recess for reducing the volume of the space in the pump housing.

7. In a fluid pump having a pump housing, a rotary impeller, a mounting plate having a central hole therethrough, and a rotatable drive shaft extending through the central hole of the mounting plate and coupled with the impeller for rotating the impeller in the pump housing;
a main seal for sealing the hole in the mounting plate while allowing rotation of the shaft and impeller relative to the mounting plate, said main seal including a first part adapted to be coupled with the impeller for rotation therewith, a second part adapted to be fixed relative to the shaft, and an elongated, tubular, resilient element adapted to extend axially of and to surround the shaft, said element having a sidewall and a pair of opposed ends, there being an annular end segment integral with the sidewall and extending laterally therefrom at one end thereof, the junction of said sidewall and said end segment normally being under tension for urging the first and second parts into surface engaging relationship with each other, and a third part for sealing the outer periphery of the pump housing to the mounting plate, said element, said end segment and said third part being of one-piece construction and said element adapted to extend away from the hole and toward the impeller, said element being free of structure immediately surrounding the same.

8. In a fluid pump as set forth in claim 7, wherein the element has an annular, hollow seat, said second part having a rib removably received within said seat.

9. In a fluid pump asset forth in claim 8, wherein the seat is transversely U-shaped.

* * * * *